(12) United States Patent
Koyama et al.

(10) Patent No.: US 6,298,818 B1
(45) Date of Patent: Oct. 9, 2001

(54) CYLINDER LINER AND CYLINDER BLOCK AND METHOD OF MANUFACTURING THE SAME

(75) Inventors: Shigeru Koyama, Nagano; Teruyuki Oda, Tokyo, both of (JP)

(73) Assignees: Kabushiki Kaisha Koyama, Nagano; Fuji Jukogyo Kabushiki Kaisha, Tokyo, both of (JP)

(*) Notice: Subject to any disclaimer, the term of this patent is extended or adjusted under 35 U.S.C. 154(b) by 0 days.

(21) Appl. No.: 09/709,792

(22) Filed: Nov. 8, 2000

(30) Foreign Application Priority Data

Feb. 16, 2000 (JP) ................................................. 12-038661

(51) Int. Cl.$^7$ ........................................................ F02F 1/00

(52) U.S. Cl. ............................................................ 123/193.2

(58) Field of Search ............................. 123/193.2, 193.3, 123/41.84

(56) References Cited

U.S. PATENT DOCUMENTS

| | | | |
|---|---|---|---|
| 3,165,983 | * | 1/1965 | Thomas .............................. 123/193.2 |
| 5,189,992 | * | 3/1993 | Hama et al. ....................... 123/41.84 |
| 5,291,862 | * | 3/1994 | Katoh et al. ....................... 123/193.2 |
| 6,123,052 | * | 9/2000 | Jahn .................................. 123/193.2 |

* cited by examiner

Primary Examiner—Marguerite McMahon
(74) Attorney, Agent, or Firm—Jordan and Hamburg LLP

(57) ABSTRACT

The cylinder liner is capable of being tightly adhered to an aluminium block. The cylinder liner is made of cast iron and formed into a cylindrical shape. In the cylinder liner, slender section is provided in a middle portion, and outer diameter of the cylinder liner is gradually made greater toward both end sections from the slender section. A plurality of projected lines are formed on an outer circumferential face of the cylinder liner with regular separations and extended in the axial direction thereof. With this structure, the cylinder liner can securely stay in a cylinder block even if an external force in the axial direction works to the cylinder liner. In the cylinder block of the present invention, a plurality of the cylinder liners are enclosed with casted aluminium.

11 Claims, 5 Drawing Sheets

CYLINDER LINER AND CYLINDER BLOCK AND METHOD OF MANUFACTURING THE SAME

BACKGROUND OF THE INVENTION

The present invention relates to a cylinder liner and a cylinder block, which are used in an engine of a vehicle, and a method of manufacturing them.

A conventional cylinder block of an engine is shown in FIGS. 7 and 8. The cylinder block 1 includes: cylinder liners 2 made of cast iron; an aluminium block 3 enclosing the cylinder liners 2; and water paths 4, through which cooling water is introduced.

Generally, cold shut and scattered structures in aluminium occur defects in aluminium-casted products.

In the case of the cylinder block 1, rate of contraction of aluminium is very high when aluminium is cooled to solidify. On the other hand, the cylinder liners 2, which have been casted with cast iron, are not thermally influenced, so that great residual stress left in the aluminium portions.

In a portion "A" (see FIG. 8), which is between the adjacent cylinder liners 30, the aluminium contracts in directions of arrows. If there is an inner defect in the portion "A", the inner defect is apt to make a crack therein. When the aluminium is cooled and contacts, the residual stress, which is caused by the contraction of the aluminium, works to various portions. Especially, the stress works to the portion "A" and portions "B" when the cylinder liners 2 are machined or pistons slide in the cylinder liners, so that the cracks are apt to be formed in the portions "A" and "B".

To prevent forming the cracks, the portions "A" and "B" are made thicker, but this countermeasure makes the cylinder block 1 bigger and heavier.

No alloy is formed between the cast iron of the cylinder liners 2 and the aluminium of the alminium block 3, so the cylinder liners 2 and the aluminium block 3 cannot tightly adhered. There are many minute clearances there between. With the minute clearances, cooling efficiency of the cooling water must be lower.

To tightly adhere the cylinder liners 2 and the aluminium block 3, many ring projections are formed in outer circumferential faces of the cylinder liners 2.

The cylinder liner 2 having the ring projections is casted in a splittable molding unit, etc.

An example of the splittable molding unit is shown in FIG. 9.

The splittable molding unit includes a lower mold 10 and an upper mold 12. A core 14 is sandwitched between the molds 10 and 12, so that a casting space is formed between an outer circumferential face of the core 14 and inner faces of the molds 10 and 12. Molten metal is introduced into the casting space. Note that, symbol "P.L" indicates parting faces of the molds 10 and 12.

Another splittable molding unit is shown in FIG. 10.

The splittable molding unit includes a lower mold 10, which has an island section 10a, and an upper mold 12, which has an island section 12a. A casting space is formed between outer circumferential faces of the island sections 10a and 12a and an inner face of the lower mold 10. Molten metal is introduced into the casting space. Note that, symbol "P.L" indicates parting faces of the molds 10 and 12.

In the case of the splittable molding unit shown in FIG. 9, ring grooves, which correspond to the ring projections, are formed in the inner faces of the molds 10 and 12. The ring projections can be formed in the cylinder liner by employing the splittable molding unit, and the cylinder liner can be easily taken out from the molds.

However, many flashes are formed in an outer circumferential face of the cylinder liner along the parting faces "P.L". Namely, the flashes are formed between the ring projections, so it is difficult to perfectly remove the flashes. If the flashes are left, the residual stress works to the aluminium block, which encloses the cylinder liners, and cracks are apt to be formed in the aluminium block.

On the other hand, in the case of the splittable molding unit shown in FIG. 10, outer diameter of the cylinder liner is not fixed in the axial direction because angle for drafting the cylinder liner from the molds must be required. Therefore, the casted cylinder liner must be machined so as to have fixed outer diameter and form the ring projections.

By forming the ring projections in the cylinder liner, adhesion between the cylinder liner and the aluminium block is improved. However, the contraction rate of the aluminium in the circumferential direction of the cylinder liner is still great; the contraction rate of the aluminium in the axial direction of the cylinder liner is not so great. So, the residual stress still damages the aluminum block when the aluminium is cooled.

SUMMARY OF THE INVENTION

The present invention is invented to solve the above described disadvantages. An object of the present invention is to provide a cylinder liner, which is capable of being tightly adhered to an aluminium block, and a method of manufacturing the cylinder liner. Another object is to provide a hard compact cylinder block, which is capable of preventing cracks and reducing size and weight, and a method of manufacturing the cylinder block.

To achieve the objects, the present invention has following structures.

The cylinder liner, which is made of cast iron and formed into a cylindrical shape, comprises:

a slender section being provided in a middle portion of the cylinder liner, wherein outer diameter of the cylinder liner is gradually made greater toward both end sections of the cylinder liner from the slender section; and a plurality of projected lines being formed on an outer circumferential face of the cylinder liner with regular separations and extended in the axial direction thereof.

Since the outer diameter of the middle slender section is shorter than that of other portions, the cylinder liner can securely stay in a cylinder block even if an external force in the axial direction, which is applied by a piston, etc., works to the cylinder liner. Namely, the adhesion between the cylinder liner and the cylinder block can be improved.

The projected lines extended in the axial direction improve strength of the cylinder liner. Therefore, the cylinder liner can be thinner and lighter.

The contraction of the aluminium in the circumferential direction, which occurs when the cylinder block is formed, can be uniformly limited by the projected lines, so that the residual stress in the contracted aluminium can be uniformly reduced. By reducing the residual stress, forming the cracks in the aluminium block can be prevented. Therefore, the aluminium block can be thinner; namely the compact and light cylinder block can be realized. When the aluminium contracts, the projected lines are tightly pinched by the aluminium, so that the adhesion between the cylinder liner and the cylinder block can be improved. Further, contact area between the two can be broader, so that the cooling efficiency of the cooling water can be improved.

In the cylinder liner, a circular groove may be formed in the outer circumferential face of the slender section. With this structure, the aluminium engages with the circular groove, so that the cylinder liner can stand against the external force in the axial direction.

In the cylinder liner, the outer circumferential face of the cylinder liner may be a casting surface. Since the casting face is a rough surface, the adhesion between the cylinder liner and the cylinder block can be improved.

The method of manufacturing a cylinder liner of the present invention comprises the steps of:

providing a core, which is made by solidifying casting sand with binders in one of the molds;

combining the other mold, which has an island section, with the one mold so as to insert the island section into an inner space of the core and form a casting space between an outer circumferential face of the island section and an inner circumferential face of the core; and filling the casting space with molten metal, wherein the core comprises:

a slender section being provided in a middle portion of the core, wherein inner diameter of the core is gradually made greater toward both end sections of the core from the slender section; and a plurality of grooves being formed on an inner circumferential face of the core with regular separations and extended in the axial direction thereof.

By filling the casting space with the molten metal, the cylinder liner can be casted in the casting space. Since components of the binders are mutated and broken by heat of the molten metal after the core is taken out from the molds, the cylinder liner can be easily taken out from the molds.

In the method, a circular projection may be formed in the inner circumferential face of the slender section of the core. With this core, the cylinder liner having the circular groove in the slender section can be manufactured.

In the cylinder block of the present invention, a plurality of the cylinder liners of the present invention are enclosed with aluminium.

The method of the cylinder block of the present invention comprises the steps of:

providing a plurality of the cylinder liners of the present invention into a mold; and enclosing the cylinder liners with casted aluminium.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Preferred embodiments of the present invention will now be described in detail with reference to the accompanying drawings.

Figure 1:
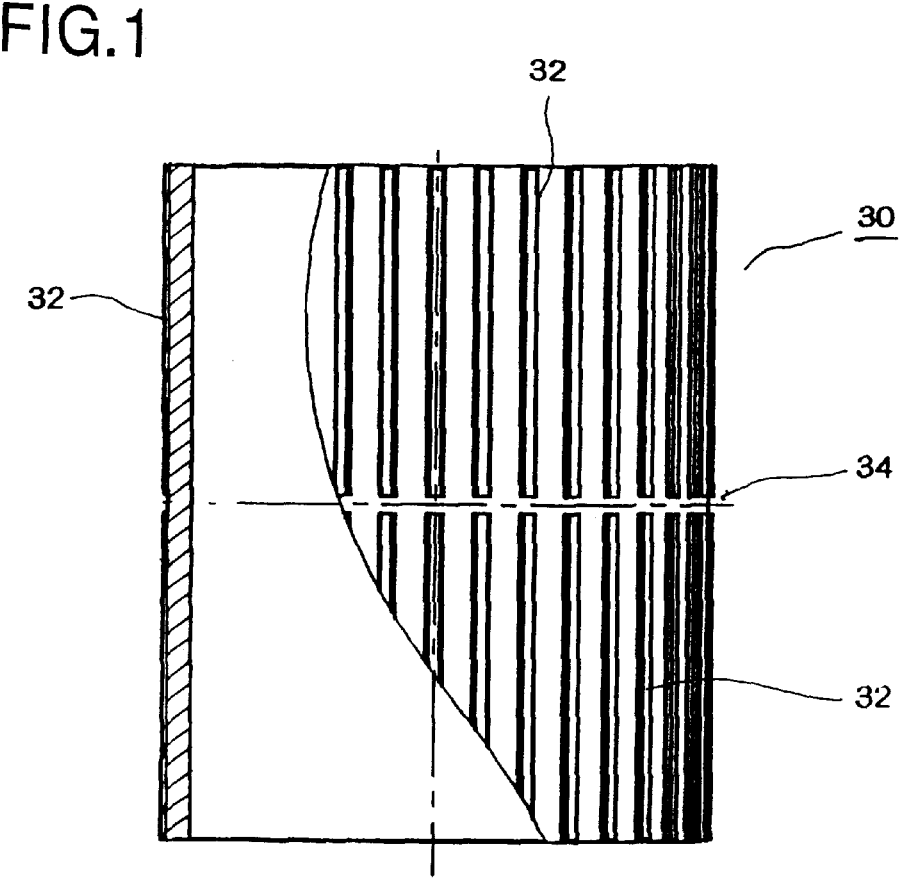
FIG. 1 is a partial front sectional view of a cylinder liner of an embodiment of the present invention.
Figure 2:
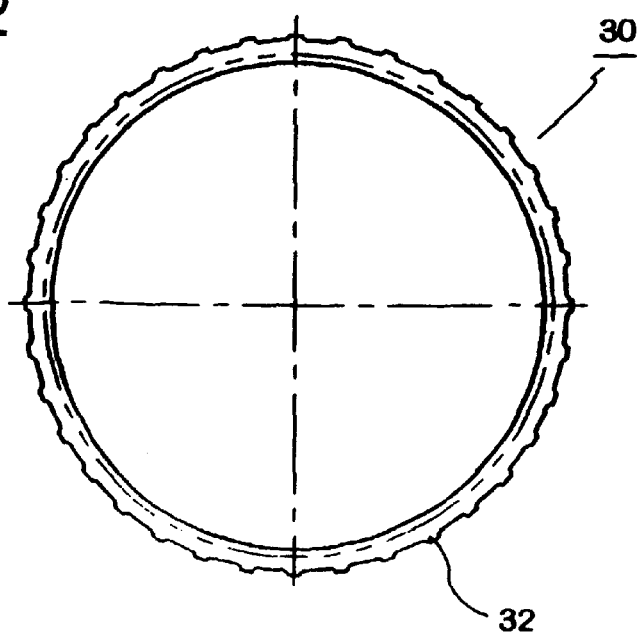
FIG. 2 is a plan view of the cylinder liner.

FIG. 1 is a partial front sectional view of a cylinder liner of an embodiment of the present invention; FIG. 2 is a plan view thereof.

The cylinder liner 30 is made of cast iron and formed into a cylindrical shape. In the cylinder liner 30, a slender section, whose outer diameter is shorter than that of other sections, is formed in a middle portion, and the outer diameter of the cylinder liner 30 is gradually made greater toward both end sections from the middle slender section. In the present embodiment, length of the cylinder liner 30 is 120 mm; the outer diameter of the end sections is 96 mm; and difference between the outer diameter of the slender section and that of the end sections is 0.2 mm. Preferably, the cylinder liner 30 has uniform thickness. Note that, said diameter difference is not limited.

A plurality of projected lines 32 are formed on an outer circumferential face of the cylinder liner 30 with regular separations and extended in the axial direction thereof.

Number and height of the projected lines 32 are not limited. Preferably, a circular groove 34 is formed in the outer circumferential face of the slender section of the cylinder liner 30. Each projected line 32 is divided by the circular groove 34. Depth of the circular groove 34 is not limited. The circular groove 34 may be communicated to grooves between the projected lines 30.

A rough casting surface is exposed in the outer circumferential face of the cylinder liner 30.

Successively, a method of manufacturing the cylinder liner 30 will be explained.

Firstly, a core, which is used in the method, will be explained.

Figure 3:
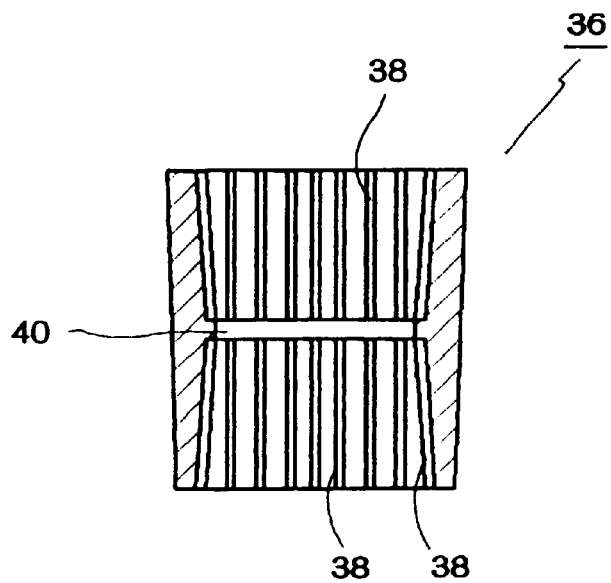
FIG. 3 is a sectional view of a core.

FIG. 3 is a sectional view of the core 36. An external shape of the cylinder liner 30 is defined by a shape of the core 36.

The core 36 is made by solidifying casting sand with binders. The core 36 comprises: a slender section, whose inner diameter is shorter than that of other sections, being provided in a middle portion of the core 36, wherein inner diameter of the core 36 is gradually made greater toward both end sections from the slender section; and a plurality of grooves 38 being formed on an inner circumferential face of the core 36 with regular separations and extended in the axial direction thereof.

A circular projection 40 is formed in the inner circumferential face of the slender section of the core 36 and projected radially inward.

Figure 4:
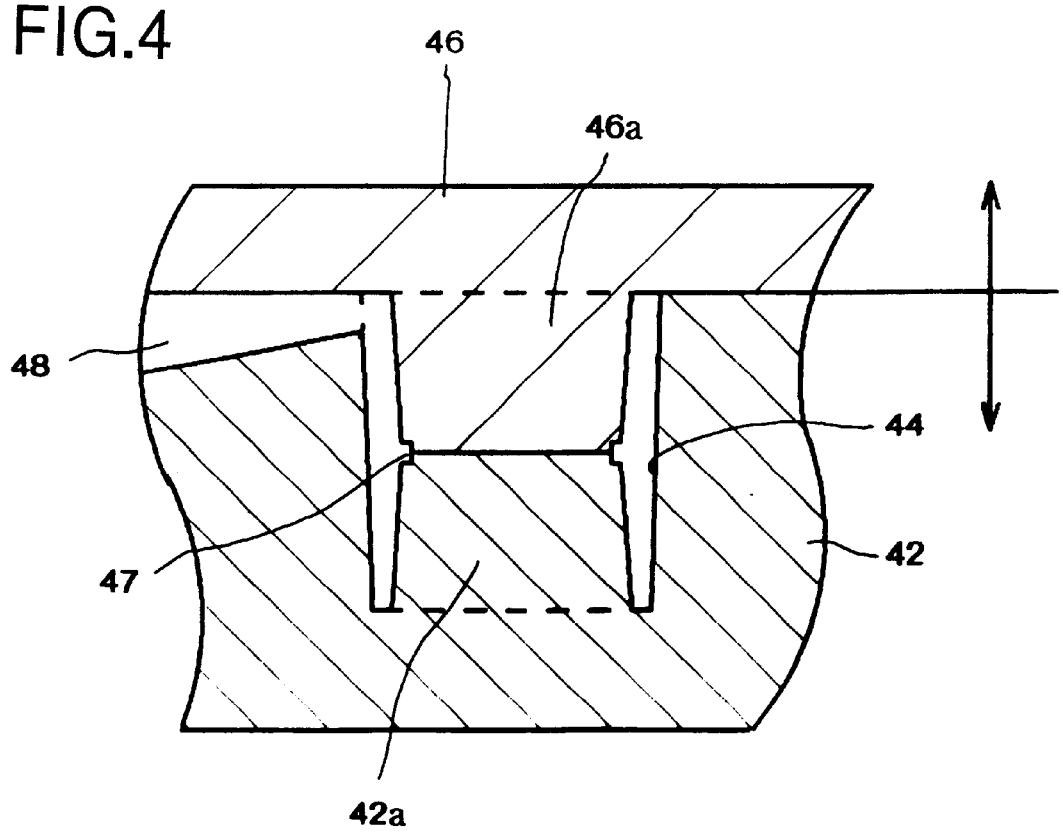
FIG. 4 is an explanation view of metallic dies for manufacturing the core.

Metallic dies for manufacturing the core 36 is shown in FIG. 4.

A movable die 42 has an concave section 44, which defines an external shape of the core 36, and an island section 42a, which is projected in the concave section 44 so as to define an inner circumferential face of a lower half of the core 36.

A fixed die 46 has an island section 46a, which is projected so as to enter the concave section 44 of the lower movable die 42 and define an inner circumferential face of an upper half of the core 36. Projected lines (not shown), which define the grooves in the inner circumferential face of the core 36, are formed in the outer circumferential faces of the island sections 42a and 46a. Circular step sections are formed at front ends of the island sections 42a and 46a so as to form a circular groove 47, which corresponds to the circular projection 40.

A symbol 48 stands for an inlet.

Casting sand and the binders, which includes thermosetting resin, are introduced into a space, which is formed between an inner circumferential face of the concave section 44 and the outer circumferential faces of the island sections 42a and 46a, then the metallic dies 42 and 46 are heated so as to chemically solidify the binders and form the core 36.

Note that, even if flashes are formed between contact faces of the island sections 42a and 46a, the flashes are formed on the circural projection 40 of the core 36, which is projected radially inward. The flashes can be easily removed by inserting a removing tool into the core 36. Even if any projections are formed between the adjacent grooves 38, the flashes formed on the circular projection 40 can be easily removed.

Figure 5:
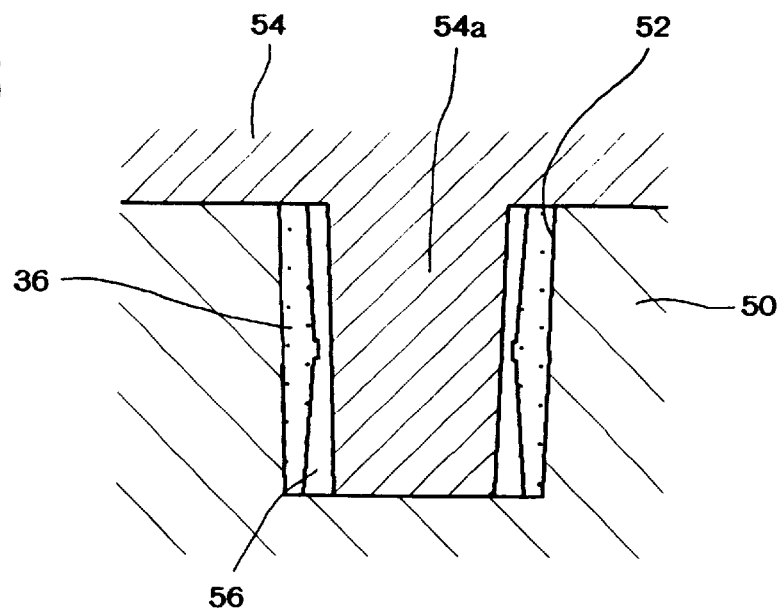
FIG. 5 is an explanation view of casting molds for manufacturing the cylinder liner.

Molds for casting the cylinder liner 30 with the core 36 is shown in FIG. 5.

A lower mold 50 has a concave section 52, in which the core 36 is accommodated. The core 36 is tightly fitted in the concave section 52.

An upper mold 54 has an island section 54a, which enters the concave section 52 to form a casting space 56, in which the cylinder liner 30 is casted, between an outer circumferential face of the island section 54a and the inner circumferential face of the core 36.

Molten metal is introduced into the casting space 56 so as to cast the cylinder liner 30.

The casted cylinder liner 30 is taken out from the molds 50 and 54 together with the core 36. Components of the binders of the core 36 are mutated and broken by heat of the molten metal when the core 36 is taken out from the molds 50 and 54, so that the cylinder liner 30 can be easily taken out.

Note that, the molds 50 and 54 are greensand molds.

A cylinder block is manufactured by the steps of: providing a plurality of cylinder liners 30 into molds; and enclosing the cylinder liners 30 with casted aluminium. Enclosing the cylinder liners 30 with aluminium can be executed by a known conventional manner.

Figure 6:
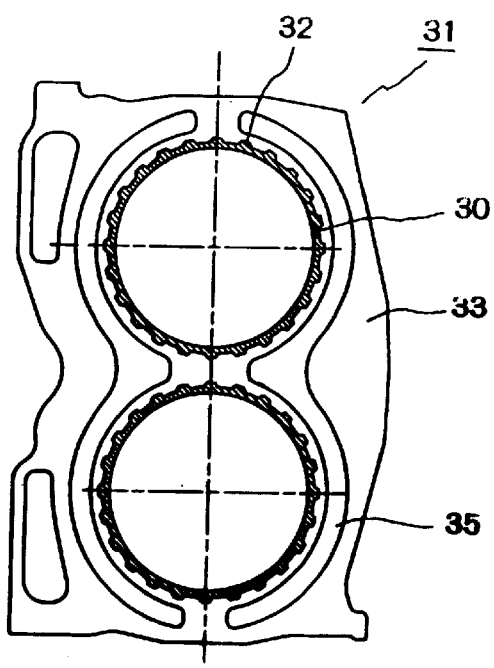
FIG. 6 is an explanation view of a cylinder block.
Figure 7:
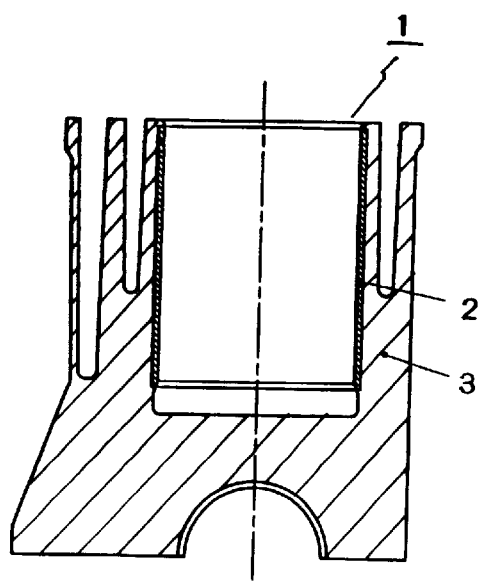
FIG. 7 is a sectional view of the conventional cylinder block.
Figure 8:
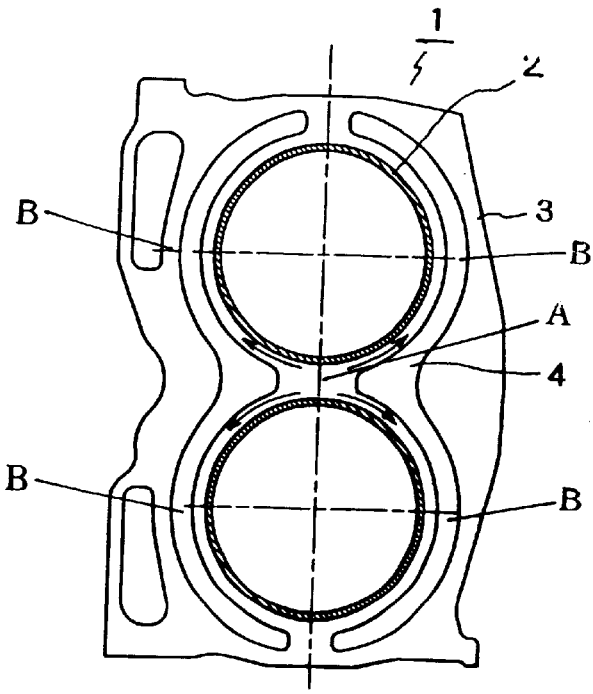
FIG. 8 is a plan view of the conventional cylinder block.

The cylinder block 31 casted by the method of the present embodiment is shown in FIG. 6. Note that, a symbol 33 stands for an aluminium block; a symbol 35 stands for water paths, through which the cooling water is passed.

In the present embodiment, the projected lines are formed on the outer circumferential face of the cylinder liner 30 and extended in the axial direction thereof, so strength of the cylinder liner 30 can be high. The cylinder block 31 will be fixed to an engine head (not shown) by bolts. The strength, in the axial direction, of the cylinder liner is high, so that deformation can be prevented. Further, the cylinder liner 30 can be thinner and lighter.

The contraction of the aluminium in the circumferential direction, which occurs when the cylinder block is formed, can be uniformly limited by the projected lines, so that the residual stress in the contracted aluminium can be uniformly reduced. By reducing the residual stress, forming the cracks in the aluminium block can be prevented. Therefore, the aluminium block can be thinner; namely the compact and light cylinder block can be realized. When the aluminium contracts, the projected lines are tightly pinched by the aluminium, so that the adhesion between the cylinder liner and the cylinder block can be improved. Further, contact area between the two can be broader, so that the cooling efficiency of the cooling water can be improved.

Since the external shape of the cylinder liner 30 has the slender section, even if an external force in the axial direction works to the cylinder liner 30 when the inner circumferential face of the cylinder liner 30 is machined or a piston slides in the cylinder liner 30, the cylinder liner 30 is held by the aluminium block. Therefore, the adhesion between the cylinder liner 30 and the aluminium block can be improved, and the cylinder liner 30 is not pulled out from the aluminium block.

In the cylinder liner 30, the circular groove 34 is formed in the outer circumferential face of the cylinder liner 30. With this structure, the aluminium engages with the circular groove 34, so that the cylinder liner 30 can stand against the external force in the axial direction.

In the cylinder liner 30, the rough casting face is exposed in the outer circumferential face of the cylinder liner 30 without machining the face, so that the adhesion between the cylinder liner 30 and the aluminium block 33 can be improved.

No flashes are formed in mid portions of the inner and outer circumferential faces of the cylinder liner 30. Unlike the conventional cylinder liner, the cylinder liner can be tightly adhered to the aluminium block without forming many ring projections. Therefore, the cylinder liner can be manufacture without machining the inner and outer circumferential faces so that manufacturing efficiency can be improved and manufacturing cost can be reduced.

In the present embodiment, the cylinder liner 30 having the external slender section and the projected lines extended in the axial direction can be casted in the molds 50 and 54 with the core 36.

Figure 10:
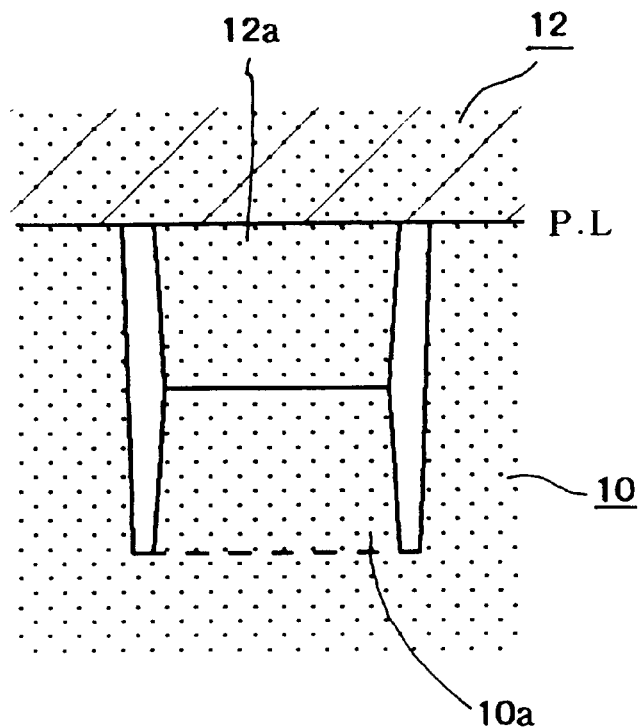
FIG. 10 is an explanation view showing the method of manufacturing the conventional cylinder liner in another splittable molding unit.

In the conventional example shown in FIG. 10, the cylinder liner having the external slender section cannot be casted due to draft angle.

Figure 9:
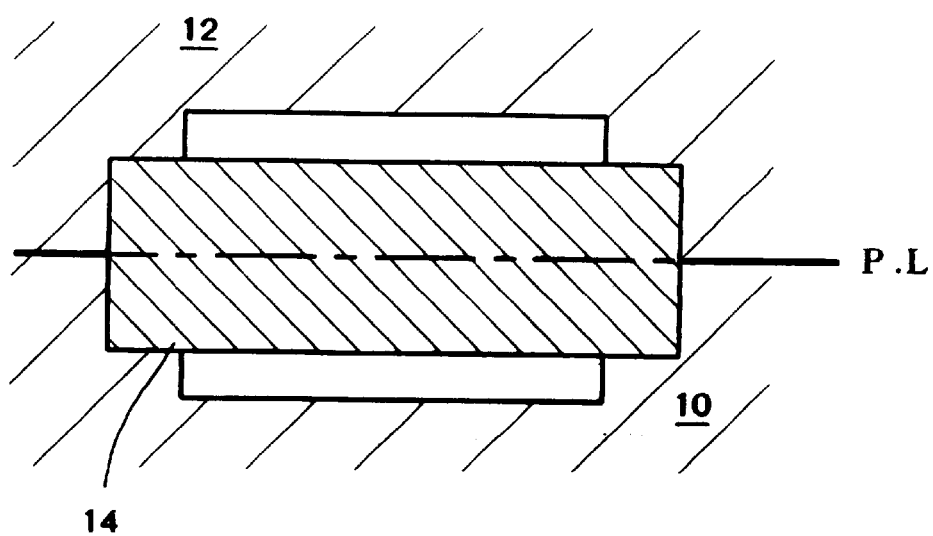
FIG. 9 is an explanation view showing the method of manufacturing the conventional cylinder liner in the splittable molding unit.
Figure 11:
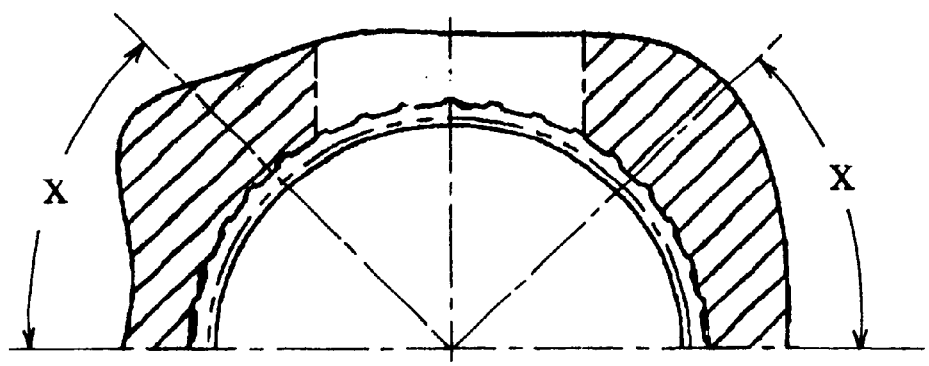
FIG. 11 is an explanation view showing an undercut portion.

In the conventional example shown in FIG. 9, the projected lines, which are formed in the outer circumferential face and extended in the axial direction, cannot be uniformly formed due to undercut portions. As shown in FIG. 11, the grooves, which are formed in the inner circumferential face of the mold, in zones "X" are undercut, so that the casted product cannot be pulled out from the mold.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A cylinder liner, which is made of cast iron and formed into a cylindrical shape, comprising:

a slender section being provided in a middle portion of said cylinder liner, wherein outer diameter of said cylinder liner is gradually made greater toward both end sections of said cylinder liner from said slender section; and a plurality of projected lines being formed on an outer circumferential face of said cylinder liner with regular separations and extended in the axial direction thereof.

2. The cylinder liner according to claim 1, wherein a circular groove is formed in the outer circumferential face of said slender section.

3. The cylinder liner according to claim 1, wherein the outer circumferential face of said cylinder liner is a casting surface.

4. A method of manufacturing a cylinder liner, comprising the steps of:

providing a core, which is made by solidifying casting sand with binders, in one of two molds;

combining the other mold, which has an island section, with said one mold so as to insert the island section into an inner space of said core and form a casting space between an outer circumferential face of the island section and an inner circumferential face of said core; and filling said casting space with molten metal, wherein said core comprises:
  a slender section being provided in a middle portion of said core, wherein inner diameter of said core is gradually made greater toward both end sections of said core from said slender section; and
  a plurality of grooves being formed on an inner circumferential face of said core with regular separations and extended in the axial direction thereof.

5. The method according to claim 4, wherein a circular projection is formed in the inner circumferential face of the slender section of said core.

6. A cylinder block comprising a plurality of cylinder liners, which are made of cast iron, formed into cylindrical shapes and enclosed with aluminium, wherein each of said cylinder liners comprising:

a slender section being provided in a middle portion of said cylinder liner, wherein outer diameter of said cylinder liner is gradually made greater toward both end sections of said cylinder liner from said slender section; and a plurality of projected lines being formed on an outer circumferential face of said cylinder liner with regular separations and extended in the axial direction thereof.

7. The cylinder block according to claim 6, wherein a circular groove is formed in the outer circumferential face of each slender section.

8. The cylinder block according to claim 6, wherein the outer circumferential face of each cylinder liner is a casting surface.

9. A method of manufacturing a cylinder block, comprising the steps of:

providing a plurality of cylinder liners into a mold, wherein said cylinder liners are made of cast iron and formed into cylindrical shapes and wherein each of said cylinder liners comprises:
  a slender section being provided in a middle portion of said cylinder liner, wherein outer diameter of said cylinder liner is gradually made greater toward both end sections of said cylinder liner from said slender section; and
  a plurality of projected lines being formed on an outer circumferential face of said cylinder liner with regular separations and extended in the axial direction thereof; and enclosing said cylinder liners with casted aluminium.

10. The method according to claim 9, wherein a circular groove is formed in the outer circumferential face of each slender section.

11. The method according to claim 9, wherein the outer circumferential face of each cylinder liner is a casting surface.

* * * * *